United States Patent [19]
Lopez

[11] Patent Number: 6,103,161
[45] Date of Patent: *Aug. 15, 2000

[54] PROCEDURE AND DEVICE FOR MANUFACTURING PLASTIC EXTRUDED SHEETS

[76] Inventor: Jose Luis Santamaria Lopez, C/ Azalea, 536, 28100 Alcobendas (Madrid), Spain

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,752

[22] Filed: Feb. 3, 1997

[51] Int. Cl.[7] .............................. B29C 47/06; B29C 47/30
[52] U.S. Cl. ................. 264/148; 264/173.18; 264/174.1; 264/245; 425/131.1
[58] Field of Search .................. 264/73, 75, 245, 264/173.18, 174.1, 148; 425/131.1, 133.5

[56] References Cited

U.S. PATENT DOCUMENTS

| | | | |
|---|---|---|---|
| 3,715,420 | 2/1973 | Kiyono et al. | 264/75 |
| 3,769,380 | 10/1973 | Wiley | 264/75 |
| 4,259,277 | 3/1981 | Hill | 264/75 |
| 4,476,075 | 10/1984 | Brinkmann et al. | 264/75 |
| 4,753,766 | 6/1988 | Pinsolle | 264/245 |
| 5,387,381 | 2/1995 | Saloom | 264/173.18 |
| 5,431,866 | 7/1995 | DeMasters et al. | 264/408 |

FOREIGN PATENT DOCUMENTS

| | | | |
|---|---|---|---|
| 3605323 | 9/1986 | Germany | 264/75 |
| 54-23662 | 2/1979 | Japan | 264/412 |

*Primary Examiner*—Mathieu D. Vargot

[57] ABSTRACT

A procedure and device are provided by means of which a coextruded sheet including an intermediate layer with multiple longitudinal strips of various colours that are perfectly delimited between each other without the colours in every two adjacent strips becoming mixed, the sheet being formed by simultaneously extruding the three layers forming it, employing a plurality of extrusion material conducts in one single extrusion head provided with adjustable passage capability, a conduct for each upper and lower layer and one for each colored strip in the intermediate layer, so that by controlling parameters such as pressure, speed and flow volume, strip uniformity is achieved in regard to both thickness and width.

4 Claims, 4 Drawing Sheets

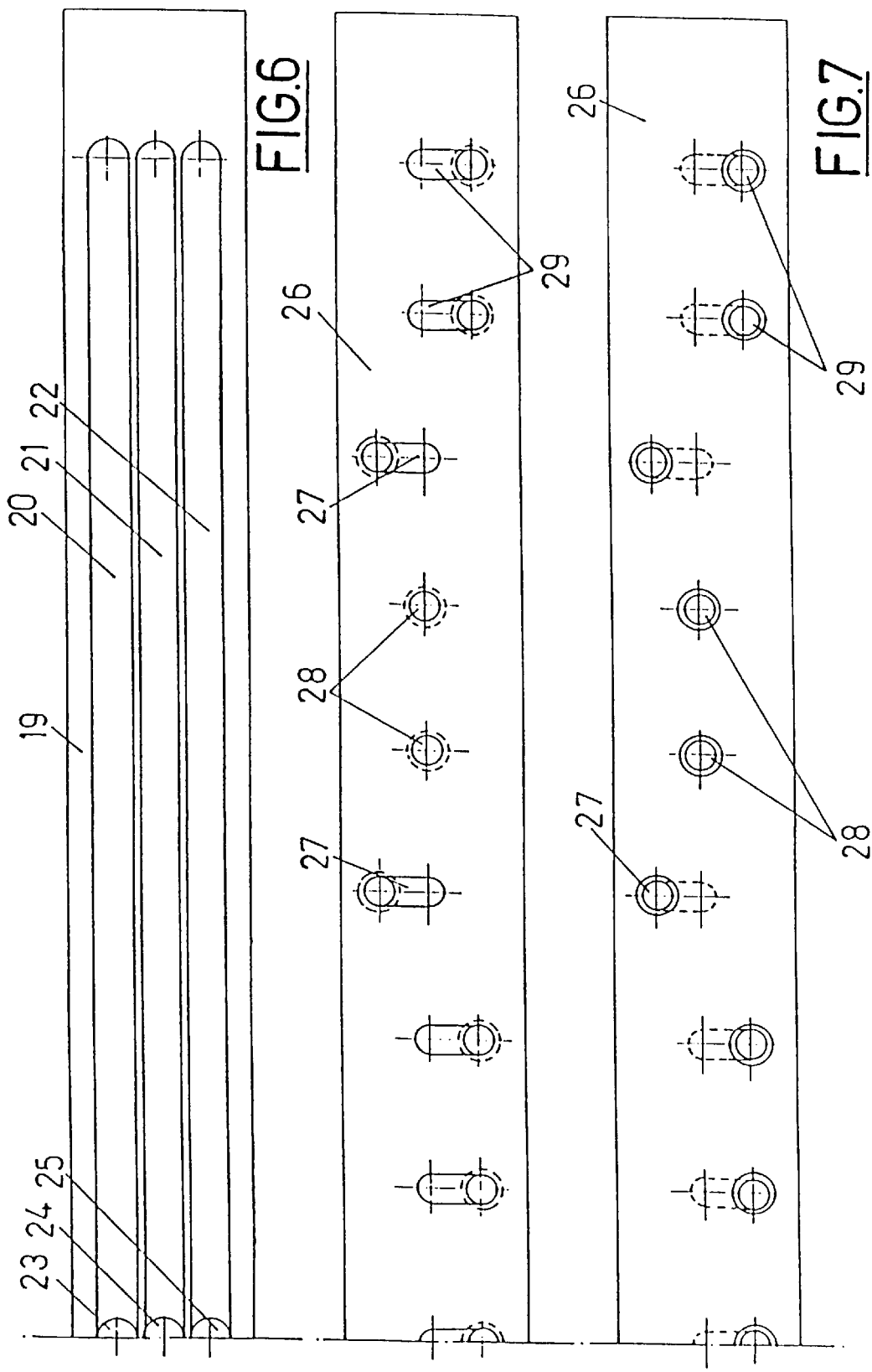

PROCEDURE AND DEVICE FOR MANUFACTURING PLASTIC EXTRUDED SHEETS

OBJECT OF THE INVENTION

The object of the present invention is related to a procedure for manufacturing coextruded plastic material sheets and to the device for implementing said procedure, providing essentially novel characteristics and substantial advantages as compared to known procedures in the current state of the art intended for similar purposes.

More specifically, the object of the invention basically consists in the development of a procedure and associated device for manufacturing coextruded sheets formed of several layers generated simultaneously, so that at least one of said layers may include the formation of longitudinal strips of one or more colours, said longitudinal strips possibly having different widths and different thicknesses based on the needs in each particular case, the limiting edges in every two consecutive adjacent strips being perfectly and clearly defined throughout their length, avoiding the migration of the colours from every two adjacent strips. Toward this end, the invention provides (practically) simultaneous dispensing of the materials forming the various layers through extrusion conducts, wherein, in the event of incorporating the layer of different colours, the extrusion device if formed by a plurality of outlet conducts, one for each strip in its respective colour, further maintaining a strict control in regard to extrusion speed, extrusion pressure and thickness of the layer being formed with the aid of means for strangling the extruded material in its passage towards the various conducts.

The field of application of the invention is very wide, generally encompassing the manufacture of articles based on thermoplastic materials, particularly the manufacture of specific containers applicable to certain food products.

BACKGROUND OF THE INVENTION

The present state of the art is known to use a thermomolding material as the basis for manufacturing specific containers for food products, in a manner that the sheets in said material present, on one of their faces, a specific design consisting in a combination of colour strips; the container thus formed presents on its exposed face the same ornamental colours as those of the starting sheet in a way that, the containers being formed by portions of the starting sheet, not all of them necessarily reveal an identical design, this being a function of the selected sheet.

Said thermomolding material sheets consist mainly of extruded film of a specific thickness provided with longitudinal colour strips distributed as necessary throughout the surface of one of its sides.

The manufacture of an extruded sheet liable to be used according to the above object presents several drawbacks which heretofore have not been adequately resolved. Thus, manufacturing methods are known to provide a sheet with a surface having longitudinal colour strips, starting from a base sheet that is subsequently covered with another sheet containing the desired colours, both sheets being bonded together by thermic welding. In other cases, a plurality of parallel longitudinal strips of different colours are bonded to a base sheet in order to achieve the desired purpose. These procedures require a considerable time and labor expenditure which results in very high production costs.

French patent No. 85/15621 provided a partial solution to the problems involving the manufacture of a sheet of this kind by developing a procedure whereby a multiple sheet formed of three different layers is extruded through a single row of multiple channels, the upper layer presenting a plurality of colour strips. In this case, the widths of the colour strips are adjusted by controlling the flow of material deposited on each respective strip. The system, however, did not serve to entirely avoid the mixing of colours in adjacent strips as a result of material migrating from one strip to the other, this defect naturally being liable to affect the final product manufactured with said thermoplastic material.

Other procedures are known which allow the desired adjacent strips to be obtained without severe problems involving the migration of colours from each strip to the adjacent strip, although the snag consists in that, in the event of changes in the manufacturing process, as for example when the strips are re-distributed, the operation requires that the machine be stopped for a lengthy period of time, furthermore involving the replacement of parts of a considerable size and cost, several such parts having to be available from stock, as necessary in each case.

It would therefore be desirable to obtain a coextruded sheet which, while eliminating the problems present in the prior art, provides a perfect finish that is free of undesirable migrations, allows for proper thickness and width adjustments in each strip and also enables fast, cost-effective production. This is one of the objects of the invention.

Furthermore, a second object of the invention consists in providing elements which, once conveniently incorporated to the extrusion head, allow for changes in the distribution of the colours strips in a minimal time and at a considerably lower cost than that of prior art devices.

SUMMARY OF THE INVENTION

The present invention has developed a procedure and device for manufacturing coextruded sheets of thermoforming material which include the above mentioned desirable characteristics. Thus, the sheet is preferably formed by differentiated layers, preferably three layers, the first layer or lower layer acting as a supporting element. This first layer is preferably of a sanitary white colour, in view that it will subsequently be in contact with the food product after forming the container. Over this lower layer lies an intermediate layer comprising a plurality of colour strips, each having a pre-established width and colour. An upper layer is finally provided, preferably of a transparent nature, with sheen.

In an illustrative, non-limiting example of the invention, the total thickness of the sheet could be distributed so as to provide approximately 5 to 50% to the lower layer, approximately 20 to 80% to the intermediate layer and approximately 2 to 20% to the lower layer.

In order to form the various layers which make up the coextruded sheet of the invention, the use of a plurality of conducts having varying widths is foreseen for the extrusion material, the width progressively increasing toward the outlet on the basis of the desired width of the strip, each of these conducts being connected to a storage tank, which contains the extrusion material, through means described hereinafter. According to this, the lower layer requires a single conduct; the intermediate layer requires as many conducts as longitudinal strips are to be formed, the passage of the feeding conduct in each of these conducts being controlled by adjustable screws which regulate the flow of extrusion material; finally, the upper or protective/finishing layer also requires a single conduct.

The functioning of all these extrusion material conducts is simultaneous, that is to say, they all simultaneously supply the material needed for forming the three different layers which constitute the coextruded sheet of the invention, and are therefore preferably assembled together in one single extrusion head. The formed sheet, as it is being carried along by the mobile base, passes through cooling means preferably comprising rollers along which the sheet is conveyed and inside of which circulates a refrigerating liquid, preferably water, designed to maintain said cooling rollers at a constant temperature. The sheet thus obtained is ready to be rolled up in coils, for example, and cut to a pre-determined length.

For forming the intermediate layer, namely the layer composed of the various longitudinal colour strips, the invention teaches that in order to avoid the inconvenience of material migrations from a strip to any of the adjacent strips, resulting in a mixture of their colours, a compromise relationship must be maintained between the various parameters involved in the formation of the sheet. Thus, in order to avoid this inconvenience and provide both the desired width and thickness to said colours strips and to the other two layers, it is necessary to establish a relationship between the speed at which the sheet is carried along and the speed and pressure at which the molten material is supplied through the extrusion conducts, in addition to controlling the temperature and corresponding fluidity of the material. Through adequate control of these parameters, formation of longitudinal strips with perfectly defined colours delimited by absolutely straight-line edges is achieved, devoid of mutual interaction between adjacent strips. Adjustment of the amount of material needed for forming each layer is implemented with the aid of a means of strangling the passage of the material coming from the respective tanks wherein it is stored, consisting, as previously stated, in screws which may be inserted to a higher or lower depth, as necessary, in the tubes connecting said material storage tanks and the final outlet conducts.

According to other aspects of the invention, the material for forming the sheet is an appropriate plastic material, preferably polystyrene, to which various dyes are added in order to provide the desired colours to the longitudinal strips, said material flowing through the extrusion conducts at a temperature comprised between 190 and 300° C., although preferably this temperature is in the order of 200° C. Furthermore, the width of the strips to be obtained varies between 3 and 600 mm; the thickness of the sheet varies from 0.3 to 2.4 mm, depending on the specific requirements in each case.

The practical embodiment of the colored material feeding device for obtaining the various longitudinal strips includes an arrangement of elements that are easily and rapidly interchanged on the basis of each specific need. Thus, in the extrusion head, an arriving plate is arranged to have at least three longitudinal channels (i.e. as many channels as longitudinal colour strips are needed for forming the central layer, plus an additional channel for the lower layer and another channel for the upper layer), positioned horizontally and located at various heights, said arriving plate being in contact with an intermediate part provided with a plurality of transversal pass-through holes in a manner that, through the contact face with the arriving plate, the inlet of said holes is connected to the various material feeding channels, said inlets being therefore arranged at the same heights through which run said channels, while on the front side the outlets of these pass-through holes emerge at the same level, preferably at an intermediate height, and so the hole conducts between entry and outlet located below the medium level run upwards along the inside of the plate; the conducts corresponding to the holes positioned above said medium level run downwards to a medium height along the interior of the intermediate plate, while the holes located at said medium height maintain their height throughout their path along the inside of said intermediate plate. Lastly, a final plate is positioned after said intermediate plate, said final plate having a plurality of recesses which, in a preferred embodiment, adopt a triangular shape and constitute the material supply sections, the lower base of each recess having the same width as that of each strip to be formed in the intermediate layer; this plate furthermore being provided with a plurality of transversal pass-through holes, one in each recess and each of which communicates with the respective hole corresponding to the intermediate plate. Based on this design, only said final and intermediate plates have to be changed in order to obtain a different distribution of the colour strips.

BRIEF DESCRIPTION OF THE DRAWINGS

The following detailed description of the object of the invention refers to the attached drawings, wherein is shown, by way of example and therefore in a totally non-limiting character, a preferred form of embodiment. In said drawings:

FIG. 6 is an elevation view of the plastic material arriving plate;

FIG. 7 shows respective views corresponding to the front and rear elevation views of the intermediate plate.

DESCRIPTION OF A PREFERRED EMBODIMENT

Figure 1:
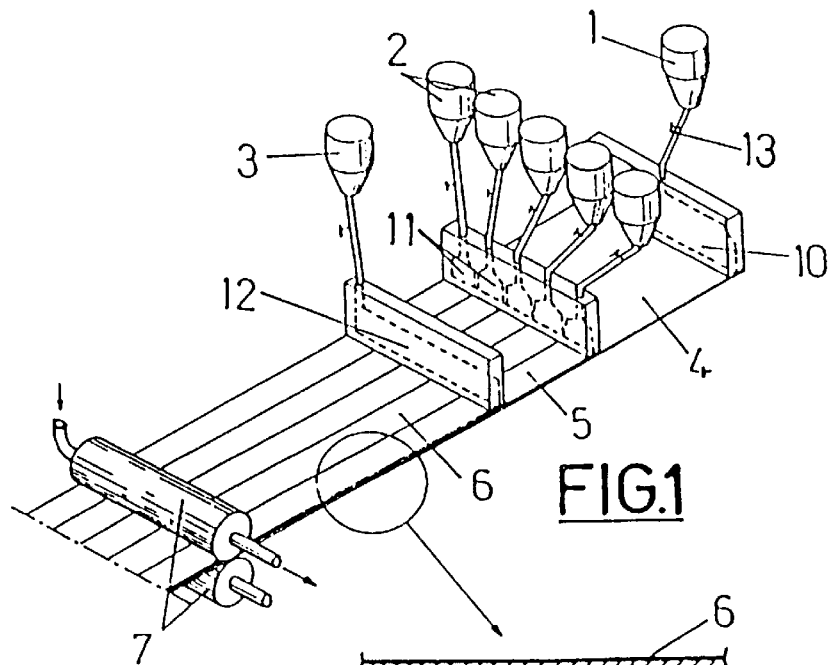
FIG. 1 shows a schematic view of the elements necessary for implementing the plastic material sheet extrusion procedure of the present invention.

In order to provide a detailed description of the preferred embodiment of the invention, permanent reference shall be made to the figures in the drawings so as to simplify the explanation. Thus, FIG. 1 schematically shows a device which intends to represent the means of extrusion for forming the sheet according to the procedure of the invention. Said extrusion means are represented by a storage tank (1) connected via an appropriate tube to a first conduct for extruding the base layer (4) or lower layer, several storage tanks (2) containing the extrusion material, each of them being respectively connected to one of the corresponding outlet conducts (11) for forming the intermediate layer (5) or colour layer, one colour for each conduct (11), and a storage tank (3) with extrusion material for forming, through the corresponding conduct (12), the upper layer (6) deposited on the previous recently formed layers. As explained hereinbefore, the complete sheet is deposited over a mobile base at a preset speed, said base not being shown as it is not an object of the present invention.

Figure 8:
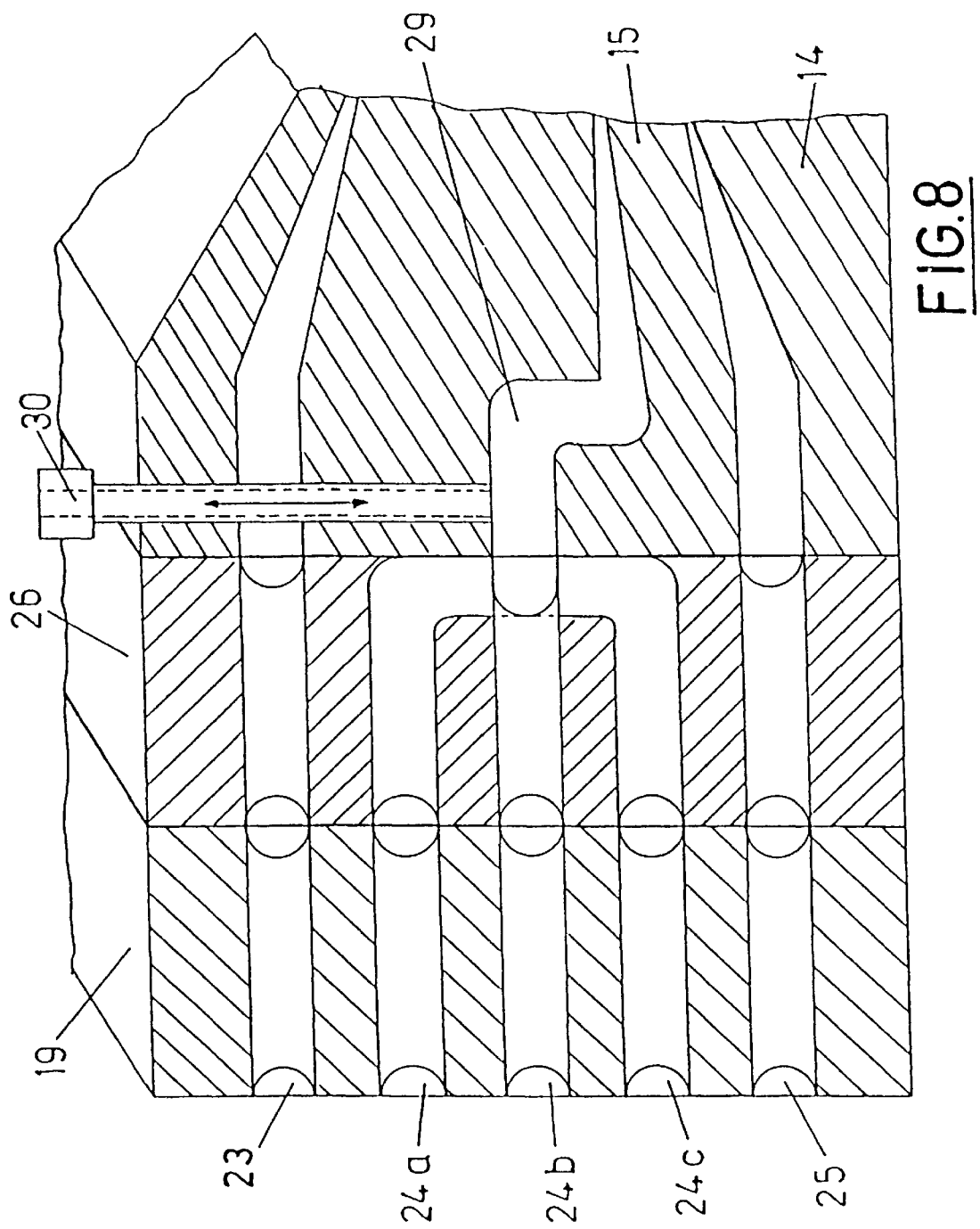
FIG. 8 shows a sectional view of the coupling of the arriving and intermediate plates to each other and to the body of the machine.

Concerning FIG. 1 of the drawings, it should be pointed out that the fact that the conducts associated to the extrusion material storage tanks (1–3) are represented in such a way as to be separated from one another by a certain distance is intended for reasons of clarity only, since it must be clearly understood that all these conducts are assembled together in a single extrusion head, as the one shown in FIG. 8, so that, as stated above, the supply of extrusion material for the various sheet layers is simultaneous, at points separated from one another by a minimal distance.

As can be seen in said FIG. 1, a single conduct is provided for each of the respective lower (4) and upper (6) layers, while in the case of the intermediate layer multiple conducts are provided, one for each intended colored longitudinal strip. These conducts supply material for the strips along a transversal line in respect to the dragging direction, in a "comb" arrangement transversal to the direction of movement of the sheet.

Figure 2:
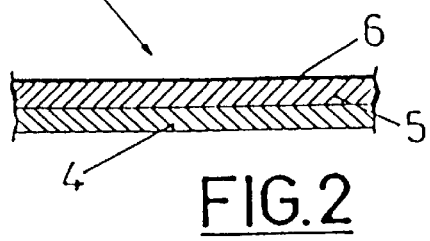
FIG. 2 shows a detail, on a larger scale, of the sheet obtained by the procedure of the invention, according to a longitudinal cut.

The final sheet therefore comprises three layers adhered to one another by means of heat, as shown more clearly in the large scale detail in FIG. 2. This figure shows the preferred embodiment of the invention, wherein the three layers have different relative thicknesses.

Figure 3:
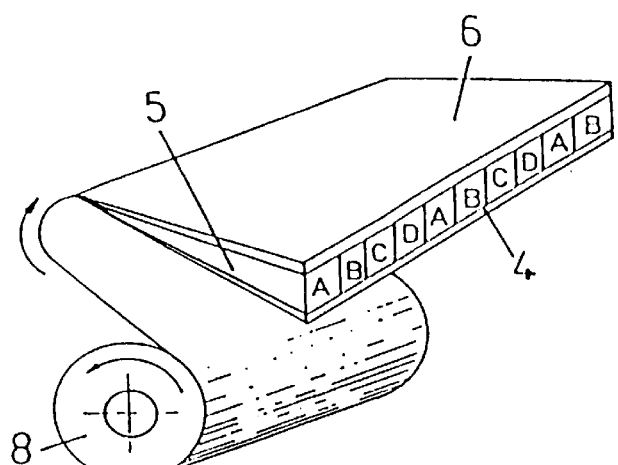
FIG. 3 also shows a schematic detail, on a larger scale, of the sheet of the invention cut transversely.

As can be seen in FIG. 3, both the upper layer (6) and the lower layer (4) are continuous, with an intermediate layer (5) "sandwiched" between them, said intermediate layer being formed by said variously colored longitudinal strips. In the example of the embodiment shown in FIG. 3, each strip is marked with a letter so that, according to said figure, the layer comprises numerous colored longitudinal strips with different A–D colours that are subsequently repeated until the full width of the intermediate layer (5) is covered. Evidently, this is merely a working example. It must be understood that any combination of colours is possible, in or out of a repetitive sequence, as dictated by the requirements of each specific application.

As can be seen in FIG. 1, the connection between the storage tanks (1, 2, 3) and the respective lower conducts is by means of tubes or other appropriate pipes inside of which flows the material down to said end conducts or channels for forming the sheet layers. Said connecting tubes incorporate, in a conventional manner, means of adjusting the flow of extrusion material preferably consisting in hand-operated screws (13), positioned in a convenient place readily accessible to the user, which screws are liable to be inserted to a larger or lesser extent in each associated tube, consequently strangling the passage of material and thus regulating the amount of extrusion material reaching each end conduct (10–12) in the extrusion head.

In a given position along the path followed by the coextruded sheet thus formed, obviously beyond the extrusion head, cooling means are provided designed to considerably reduce the temperature of the sheet before it is rolled into coils for storage or shipment. Said cooling means preferably consist in several cylinders (7) maintained at a constant temperature, overlaid two by two and placed parallel to each other, inside of which a cooling fluid, preferably water, is made to circulate under pressure. The cylinders must therefore be fitted with inlet and outlet conducts (not referenced) for the cooling fluid, arranged so that the sheet obtained passes in between and is in contact therewith.

Figure 4:
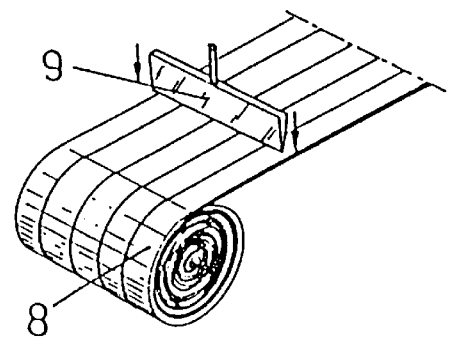
FIG. 4 also shows a schematic view of the sheet obtained, conveniently rolled up to form the coil and subject to the action of a cutting means.

Subsequently, the sheet is rolled up in a conventional manner to form a coil (8) for packing and storage. The sheet is cut to the desired length using conventional cutting means (9), as shown schematically in FIG. 4 of the drawings, said cutting means being liable to include sensors, e.g. photoelectric cells or similar devices, for detecting the various colours.

Figure 5:
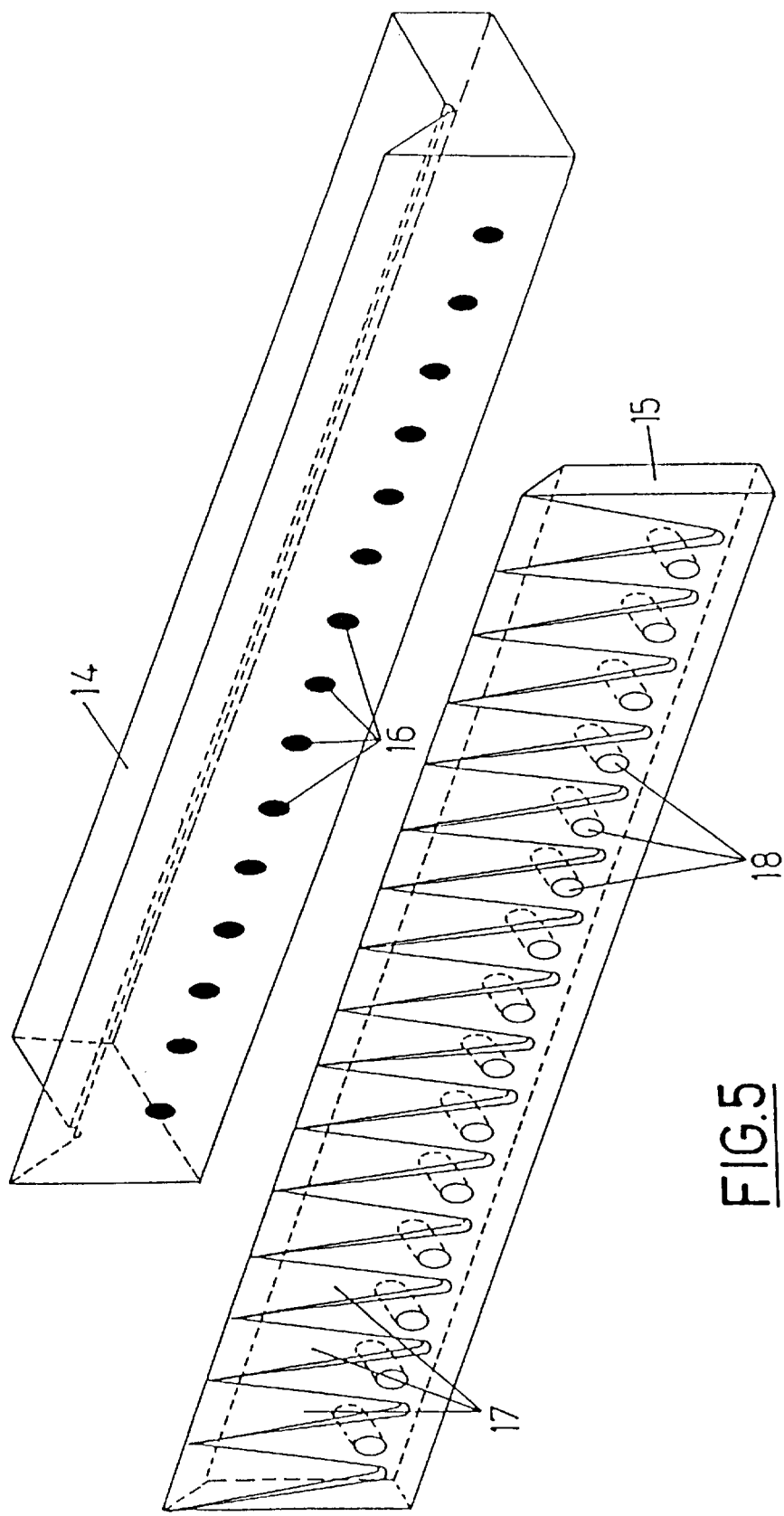
FIG. 5 is a view of the lower part of the machine carrying the final strip forming plate, shown separately.

The procedure is implemented in the manner previously described and according to the schematic stage and component display shown in FIGS. 1 to 4. However, and as previously explained, the invention incorporates some very important improvements which affect the construction of the extruded plastic material supplying device, particularly in regard to the portion of said device for forming the intermediate sheet with the various colored strips (6). As can be seen in FIG. 5, a lower part (14) or base is shown, separated from the strip forming end plate (15). As can be seen, said part (14) is preferably generally prism-shaped and provided with a protruding triangular portion and a plurality of internally threaded holes (16) in the face contacting with said end plate (15). Said plate (15) is also prism-shaped and has a bevelled edge so that when adapted to part (14), said edge appears as a continuation of the triangular portion of said base part. Plate (15) has a plurality of recesses (17) that are preferably formed with a triangular shape and which constitute the material supply sections corresponding to the formation of the strips in layer (5) of the extruded sheet. These recesses have been machined in plate (15) so that they become deeper as they descend according to the position shown in the drawing, namely as they advance toward the vertex in each triangular section, while at the base they remain practically flush with the plate (15) surface. This plate (15) also includes a plurality of pass-through transversal holes (18) positioned to correspond with holes (16) of lower part (14), capable of receiving screws (not shown) which are screwed into said holes (16) once the plate is adapted to part (14), thus establishing the attachment of both said parts.

FIG. 6 shows a side elevation view of the extrusion material arrival part (19) necessary for forming the various layers, including the intermediate layer which is preferably formed by various longitudinal colored strips. This figure shows an example of an embodiment for illustrative purposes only, so that the invention can be readily understood, wherein three channels (20, 21, 22) are provided which extend almost along the entire length of said part, closed at its innermost end, while at the other external end respective holes (23, 24, 25) are formed for feeding the material toward said channels. As will be understood, the arrangement of the three channels (20 to 22) offers the possibility of feeding extrusion material for forming the layers, one for each channel. That is to say, the upper positioned channel (20) preferably supplies the material necessary for forming upper layer (6); the intermediately positioned channel (21) preferably supplies the material necessary for forming a single intermediate layer (5); while the lower channel (22) likewise preferably supplies the material necessary for forming the sheet's lower layer (4). Consequently, according to an embodiment such as the one shown in FIG. 6, the sheet's intermediate layer (5) can only be of a single colour, since only one material feeding channel is provided for its formation; however, and in view that the formation of the intermediate layer preferably includes several longitudinal strips of various colours, it will be understood that the number of channels in part (19) must be greater, that is to say, in addition to the upper and lower positioning channels (20, 22) for respectively forming said layers (6, 4) in the final sheet, as many intermediate channels (21) must be provided as longitudinal colored strips are foreseen for the intermediate layer. For example, so that a final sheet contains an intermediate layer with two or three colored strips, the number of intermediate channels (21) in part (19) must be three (one for each colour), which added to the upper and lower channels (20, 22) makes a total of five channels.

Said arrival plate (19) is in contact with an intermediate plate (26), the front and real elevation views of which are shown in FIG. 7. As can be seen, this intermediate plate (26) has a plurality of pass-through holes (27, 28, 29) whose entry openings are positioned at different heights, as shown in the lower view in FIG. 7. Thus, when intermediate plate (26) is coupled onto arrival plate (19), the inlet to each hole (27) located higher up is in direct contact with channel (20), located higher that arrival plate (19), so that through these holes the material present in said channel is supplied for forming the sheet's upper layer through said outlet holes (27); the same applies for the material of the present colour in channel(s) (21), which is/are in contact with the inlet of holes (28) located at an intermediate height, through which the colored strips in the intermediate layer are formed, and finally, the same applies also for holes (29), whose inlets are located at the same height and are connected to lower channel (22) for forming the lower layer. The external outlets of holes (27 to 29) are all the same height, coinciding with the position of intermediate holes (28), so that the conduct corresponding to each hole (27) runs downwards along the interior of part (26) until it reaches the desired medium height, whereas the conduct corresponding to lower holes (29) runs upwards along the interior of the part until it reaches said outlet height.

This arrangement can best be appreciated in FIG. 8, wherein a section in the coupling of the arrival (19) and intermediate (26) plates at the machine's body is represented schematically. The figure shows the inlets (23; 24a; 24b; 24c; 25) of the respective channels corresponding to arrival plate (19), shown schematically in communication with hole (29) in the intermediate plate and which, as previously stated, extends in an intermediate position regardless of the initial height of the hole with which it communicates. This figure shows, equally schematically, the position of hand-operated screw (30) provided for adjusting the amount of material flowing through the corresponding conduct toward the outlet, as previously explained.

The foregoing describes a preferred form of embodiment of the invention. In any case, the terms in this description should not be interpreted as limiting in any sense, but only as a means of providing a clearer description of the characteristics and advantages provided by the invention. For example, FIG. 1 shows a number of final conducts respectively associated to storage tanks (2) for the extrusion material used in forming the respective longitudinal colored strips; however, the number of conducts may vary widely (FIG. 3 shows several more strips) on the basis of the needs and requirements in each particular case. On the other hand, in the view displayed in this same FIG. 1, all the longitudinal strips are shown to have the same width, although this fact is intended to impose no limit whatsoever on the invention, since the widths may vary from one strip to the other. Likewise, the sheet cooling means are arranged as superimposed transversal cylinders, although naturally other forms of materializing said cooling means may perfectly well be provided. The number of arrival plate intermediate channels (21) is also liable to variation based on the number of colour strips in the finished sheet's intermediate layer.

The contents of this description need not be more extensive for the expert on the subject to understand the scope and the advantages deriving from the invention, in addition to developing and putting into practice the object thereof.

Notwithstanding the above, it should be evident that the invention has been described according to a preferred embodiment and is therefore liable to modifications provided they do not impose any alteration on the basic nature of the invention, said modifications being such as to affect the size, shape and/or the manufacturing materials. sheet, said layers are thermally welded to each other to obtain the sheet, the sheet obtained being submitted to a cooling means for cooling the sheet down to a preset temperature and a subsequent cutting means for cutting the sheet to a present length

What is claimed is:

1. Procedure for manufacturing coextruded sheets, by which a sheet is obtained that is provided with a plurality of longitudinal strips of various colours, the sheet being formed from various layers including a lower supporting layer, an intermediate layer comprising a plurality of longitudinal colored strips and a bright finishing upper layer, characterized in that the sheet is produced by selectively controlling the pressure, speed, flow volume and maintaining the temperature between 190° C. and 300° C. of the material for forming the various layers such that:

(i) the lower layer comprises approximately between 5 and 50% of the total structure; the intermediate layer comprises approximately 20 to 80% of the total structure; and the upper layer comprises approximately 2 to 20% of the total thickness, (ii) the thickness of the sheet being varied between 0.3 and 2.4 mm, (iii) the respective widths of the strips in the intermediate layer being varied between 3 and 600 mm;

simultaneously superimposing the various layers;

extruding the various superimposed layers for forming the sheet;

cooling the sheet down to a preset temperature; and cutting the sheet to a preset length.

2. The procedure for manufacturing coextruded sheets of claim 1 whereby the temperature of said material for forming the various layers is approximately 200° C.

3. In a device for manufacturing a multilayer plastic sheet having (i) first extruding means for separately extruding at least three plastic layers, the layers including a lower supporting layer, an intermediate layer having a plurality of longitudinal colored strips, and a bright finishing upper layer, (ii) means for simultaneously superimposing the extruded layers, and (iii) second extruding means for extruding the superimposed layer to provide the multilayer plastic sheet, a method for avoiding a migration of colors at the edges of the colored strips of the intermediate layer comprising the steps of:

(a) providing a separate supply of extrusion material for the lower supporting layer, the upper layer, and each strip of a different color of the intermediate layer;

(b) supplying extrusion material from the separate supplies to the first extruding means; and (c) selectively controlling the pressure, speed, flow volume and maintaining the temperature between 190° C. and 300° C. of the supply of extrusion material so that, the lower layer comprises approximately between about 5 and about 50% of the thickness of the sheet, the intermediate layer comprises approximately between about 20 and about 80% of the thickness of the sheet, and the upper layer comprises approximately between about 2 and about 20% of the sheet, and the intermediate layer comprises strips having widths of approximately between about 3 and about 600 mm.

4. The method for manufacturing a multilayer plastic sheet of claim 3 wherein the temperature of said material for forming the various layers is approximately 200° C.

* * * * *